3,215,519
HERBICIDAL METHOD
Jacques Desmoras, Orly, and Pierre Jacquet, Arcueil, France, assignors to Rhone-Poulenc S.A., Paris, France, a French body corporate
No Drawing. Filed Apr. 12, 1962, Ser. No. 186,839
Claims priority, application France, Apr. 17, 1961, 858,944
2 Claims. (Cl. 71—2.3)

This invention relates to herbicidal compositions.

It has unexpectedly been found that p-thiocyano-N,N-dimethylaniline is a very useful herbicide.

According to the present invention, there are provided herbicidal compositions which comprise, as active ingredient, p-thiocyano-N,N-dimethylaniline and at least one inert diluent suitable for use in herbicidal compositions, the composition being solid, semi-solid or a solution or suspension of the active ingredient in a liquid medium containing or consisting solely of a surface-active agent (referred to in the art as a wetting, dispersing or emulsifying agent). Preferably the compositions contain between 0.005 and 50% by weight of p-thiocyano-N,N-dimethylaniline.

The p-thiocyano-N,N-dimethylaniline can be incorporated with various materials to prepare the new herbicidal compositions of the invention in solid, semi-solid, e.g. paste, or liquid form. Solid herbicidal compositions may be obtained in the form of free-flowing dusts or powders by admixing the p-thiocyano-N,N-dimethylaniline with finely divided compatible diluents such as talc, calcined magnesia, kieselguhr, tricalcium phosphate, powdered cork, absorbent carbon black or a clay such as kaolin or bentonite. Liquid herbicidal compositions of the invention contain the p-thiocyano-N,N-dimethylaniline suspended or dispersed in water or other liquid carrier, which may be a solvent for the compound, together with a surface-active agent, or in solution in a surface-active agent. In fact, preferred herbicidal compositions of the invention whether in liquid, solid or semi-solid form contain the p - thiocyano - N,N - dimethylaniline homogeneously admixed with a surface-active agent. The surface-active agent used may be of the ionic or non-ionic type, for example, sulphoricinoleates, lignosulphates, quaternary ammonium derivatives, products based on condensates of ethylene oxide with long chain alcohols or phenols, such as the condensates of ethylene oxide with octyl phenol, or fatty acid esters of anhydrosorbitols which have been rendered soluble by etherification of the free hydroxyl groups by condensation with ethylene oxide. It is preferred to use non-ionic compounds because they are not sensitive to electrolytes. Generally the surface-active agent will comprise not more than 5 to 20% by weight of the composition and, in certain compositions, the percentage will be 1% or less. Liquid compositions may thus take the form of aerosols, suspensions, emulsions or solutions in aqueous, organic or aqueour organic media, for example aromatic hydrocarbons such as toluene or xylene, or mineral, animal or vegetable oils, or mixtures of these diluents. When desired, the emulsions of the p-thiocyano-N,N-dimethylaniline may be prepared in the form of self-emulsifying concentrates containing the active substances dissolved in a surface-active agent or in a solvent compatible with the said agent, a simple addition of water producing compositions ready for use.

Solid compositions are preferably prepared by grinding the solid diluents with the p-thiocyano-N,N-dimethylaniline, or by impregnating the solid diluent with a solution of the p-thiocyano-N,N-dimethylaniline in a volatile solvent, evaporating the solvent and, if necessary, grinding the product so as to obtain a powder.

The p-thiocyano-N,N-dimethylaniline may be employed in admixture with other herbicides including substances having a synergistic effect.

The herbicidal compositions of the present invention are useful as post-emergence herbicides by dusting over the plants to be destroyed; they may also be used as total herbicides, more particularly on annual weeds, desiccants for plants such as the potato, e.g. potato-haulm destroyers, and defoliants. The active ingredients are, of course, applied in amount sufficient to exert the desired herbicidal effect, and generally this is achieved by application of compositions so as to give 1 to 10 kg. of p-thiocyano-N,N-dimethylaniline per hectare.

The following examples illustrate herbicidal compositions according to the invention.

*Example I*

A condensation product (0.2 g.) of octylphenol (1 mole) and ethylene oxide (10 moles) is added to a solution of p-thiocyano-N,N-dimethylaniline (1 g.) in acetophenone (5 cc.). The solution obtained is suspended in water (200 cc.) and the emulsion thus produced is used immediately for the destruction of weeds.

*Example II*

A condensation product (0.2 g.) of octylphenol (1 mole) and ethylene oxide (10 moles) is added to a solution of p-thiocyano-N,N-dimethylaniline (1 g.) in gas oil (25 cc.). The solution obtained is suspended in water (200 cc.) and the emulsion thus produced is used immediately for the destruction of weeds.

In each of the foregoing examples the aqueous emulsion or suspension is used to destroy weeds within an area of 2 sq. metres.

We claim:

1. A method for the prevention of growth and destruction of unwanted vegetation in areas containing growing plants which comprises applying to the area, in the form of a herbicidal composition comprising at least one inert diluent, p-thiocyano-N,N-dimethylaniline, in amount sufficient to prevent growth of and destroy the unwanted vegetation.

2. A method for the prevention of growth and destruction of unwanted vegetation in areas containing growing plants which comprises applying to the area, in the form of a herbicidal composition comprising at least one inert diluent, p-thiocyano-N,N-dimethylaniline, at the rate of 1 to 10 kg. per hectare.

References Cited by the Examiner
UNITED STATES PATENTS 2,024,098  12/35  Heckert _____ 167—30
2,203,919  6/40   Murphy _____ 167—22

OTHER REFERENCES

Hartzell et al.: Contribution From Boyce Thompson Institute, vol. 6, pages 269 to 277 (pages 271 and 273 particularly relied on), 1934.

JULIAN S. LEVITT, *Primary Examiner.*

LEWIS GOTTS, *Examiner.*